US006549957B1

(12) United States Patent
Hanson et al.

(10) Patent No.: US 6,549,957 B1
(45) Date of Patent: Apr. 15, 2003

(54) APPARATUS FOR PREVENTING AUTOMATIC GENERATION OF A CHAIN REACTION OF MESSAGES IF A PRIOR EXTRACTED MESSAGE IS SIMILAR TO CURRENT PROCESSED MESSAGE

(75) Inventors: James E Hanson, Yorktown Heights, NY (US); Jeffrey O Kephart, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/218,696

(22) Filed: Dec. 22, 1998

(51) Int. Cl.⁷ .............................. G06F 3/00; G06F 15/16
(52) U.S. Cl. ............................................ 710/5; 709/206
(58) Field of Search .............................. 709/206; 707/1, 707/10; 710/5

(56) References Cited

U.S. PATENT DOCUMENTS

| 4,815,030 A | * | 3/1989 | Cross et al. ................. 707/10 |
| 5,150,110 A | * | 9/1992 | Breeden ................ 340/825.44 |
| 5,230,048 A | * | 7/1993 | Moy ............................. 707/1 |
| 5,440,723 A | | 8/1995 | Arnold et al. .............. 395/181 |
| 5,452,442 A | | 9/1995 | Kephart ................. 395/183.14 |
| 5,485,575 A | | 1/1996 | Chess et al. ........... 395/183.14 |
| 5,572,590 A | | 11/1996 | Chess ............................ 380/4 |
| 5,613,002 A | | 3/1997 | Kephart et al. ................ 380/4 |
| 5,619,648 A | * | 4/1997 | Canale et al. ............... 709/206 |
| 5,634,005 A | * | 5/1997 | Matsuo ....................... 709/206 |
| 5,751,960 A | * | 5/1998 | Matsunaga .................. 709/206 |
| 5,870,548 A | * | 2/1999 | Nielsen ....................... 709/206 |
| 6,021,427 A | * | 2/2000 | Spagna et al. .............. 709/206 |
| 6,178,442 B1 | * | 1/2001 | Yamazaki .................... 709/206 |
| 6,182,118 B1 | * | 1/2001 | Finney et al. ............... 709/206 |
| 6,189,027 B1 | * | 2/2001 | Haneda et al. .............. 709/206 |
| 6,249,805 B1 | * | 6/2001 | Fleming, III ................ 709/206 |

FOREIGN PATENT DOCUMENTS

| JP | 409319452 A | * | 12/1997 |
| JP | 410222438 A | * | 8/1998 |

OTHER PUBLICATIONS

Rosen, Eric C. et al., "Vulnerabilities Of Network Control Protocols: An Example", Computer Comm. Review, pp. 10–16, Jul. 1981.
Spafford, Eugene H., "The Internet Worm–Crisis and Aftermath", Comm. Of the Acm, 32:678–688, Jun. 1989.
Manber, Udi, "Chain Reactions in Networks", Computer, pp. 57–63, Oct. 1990.

* cited by examiner

Primary Examiner—Thomas Lee
Assistant Examiner—Chun Cao
(74) Attorney, Agent, or Firm—Gail H. Zarick; Harrington & Smith, LLP

(57) ABSTRACT

A digital data processing system is provided with an information extracting portion or step for extracting information from each message processed by an entity of the system, where the extracted information permits that message or a similar message to be recognized. The system further includes a storage portion or step of storing the extracted information in a database of extracted information. The database has the extracted information for each message stored in an entry associated with the message. The invention further provides a comparison portion or step for comparing each message received or originated by the entity against the database entries stored in the storage segment and, if an entry is found to be sufficiently similar to the received message, for preventing the received message from triggering the generation and forwarding of a new message, thereby avoiding the creation of a network chain reaction or a maelstrom.

38 Claims, 9 Drawing Sheets

Original message

```
Jeff,
FYI...in case you didn't already see this.
--Jim

> To all:
> We will be meeting on Friday, Sept.11 in
>room H2-F28 to discuss maelstrom properties
> and possible solutions
> --Jim
```

FIG.4A

Summary jeff fyi in case you didn't already see this jim

*[copy of message 140343 received 9/9/98 from hanson]*

FIG.4B

Unimportant changes

```
please come im bringing cookies

[copy of message 140343 received 9/9/98
from hanson]
```

FIG.5A

Important changes

```
attention attention attention we have
rescheduled this for today at 1 pm

[copy of message 140343 received 9/9/98
from hanson]
```

FIG.5B

The original message

To all:
We will be meeting on Friday, Sept.11 in room H2-F28 to discuss maelstrom properties and possible solutions
--Jim

FIG.7A

The transformed message to all we will be meeting on Friday, Sept.11 in room h2f28 to discuss maelstrom properties and possible solutions jim

FIG.7B

APPARATUS FOR PREVENTING AUTOMATIC GENERATION OF A CHAIN REACTION OF MESSAGES IF A PRIOR EXTRACTED MESSAGE IS SIMILAR TO CURRENT PROCESSED MESSAGE

FIELD OF THE INVENTION

This invention relates generally to digital data processors and networks of intercommunicating digital data processors capable of automatically generating messages and, in particular, to methods and apparatus for preventing an occurrence of infinite loops of automatically generated messages within and among digital data processors.

BACKGROUND OF THE INVENTION

Systems that are capable of automatically generating one message in response to another are intrinsically vulnerable to a phenomenon referred to herein as a "maelstrom". A maelstrom can be viewed as a chain reaction in which a single message can unintentionally trigger the generation of a large, rapidly growing, potentially infinite number of messages, quickly swamping and therefore incapacitating the communications network.

Recent years have seen a number of such chain reactions involving message passing in networks. Examples include the following.

(1) A chain reaction occurred in an Ethernet environment, as described by U. Manber, Chain reactions in networks, Computer, pages 57–63, October 1990. The chain reaction was caused by an inconsistency between two different versions of the Berkeley Unix operating system, which had incompatible conventions for specifying broadcast messages.

(2) A 'cycled users' phenomenon, familiar to email postmasters, occurs when a person having accounts on two or more systems directs each system to forward incoming email to the other. In this simple form it is easily detected, but more complex chains of forwarding involving more than two accounts can escape efficient detection. A variation of this type of forwarding loop can occur when there are delays in processing a user's instructions to change the final destination from one system to another. The user's mail may cycle if the systems' configurations are changed in the wrong order.

(3) Chain reactions resulting from erroneous network administration messages can be caused, for example, when a workstation broadcasts its own hostname on startup. Certain types of configuration error, such as an erroneous hostname, can generate an infinite sequence of low-level error messages.

(4) An Arpanet chain reaction occurred in 1980, in which a recurrent error at one host caused a loop of routing update messages. The entire network was ultimately brought down by the resulting flood of messages, as described by E. C. Rosen, Vulnerabilities of network control protocols: An example, Computer Comm. Review, pages 10–16, July 1981.

(5) Finally, a chain reaction was caused by the Internet "worm" of November 1988, as described by E. H. Spafford, The internet worm: Crisis and aftermath. Communications of the ACM, 32:678–688, June 1989.

The examples given above were triggered and/or propagated by a design flaw, hardware failure, or software failure at one or more elements in the network. With the advent of sophisticated message processing systems such as intelligent agents, however, a new variety of chain reaction is likely to occur. This new phenomenon, referred to herein as the maelstrom, is not due to any flaw or failure of any element, but is instead characterized by the collective behavior of many agents, each of which, considered in isolation, is working properly.

Throughout the following discussion, the term "message" refers to a body of data sent from one entity to another in a network. Messages may be generated by and/or intended for humans (as, for example, email messages); nonhuman agents (e.g., bids in an automated auction); or lower-level processes (e.g., TCP/IP signals). An "agent" is an entity in a network capable of receiving messages from, and generating messages for, other such entities. "Forwarding" refers to the act by an agent of generating one or more messages as a result of receiving a message. In general, the generated message(s) may differ from the received one. A "transmission step" is the transmission of a single message from one agent to another. A "maelstrom" is a self-sustaining chain reaction of forwarding events in which an agent receives messages(s) that were ultimately triggered, through any number of intermediate transmission steps, by message(s) sent by that agent. In a typical maelstrom, the received message triggers a new sequence of forwarding events ultimately causing the agent to receive another message that triggers yet another sequence, and so forth, indefinitely.

As an example of how a maelstrom might naturally occur in a network of email forwarding agents, one may consider the following scenario. A typical computer user ("Fred") is one of a small group of friends who exchange jokes with one another via email. Fred decides to automate the distribution of jokes, and instructs his mail agent to forward to his friends any incoming mail with the word "Joke" in the subject line. This idea then occurs independently to some small fraction other users, and soon jokes are being forwarded several times, from mailing list to mailing list. Eventually there are enough users forwarding jokes that one of the jokes that Fred's agent had forwarded comes back to Fred. Of course, it is automatically forwarded, and the cycle begins again. As the same joke keeps coming back to Fred, it is again forwarded, endlessly. Every time the joke goes around in this cycle, everyone who originally received the joke receives it again, and forwards it again. Furthermore, because both the original message and each copy are forwarded independently, the number of copies of the message grows rapidly with time. Before long, the network used for e-mail delivery is swamped, and can't be used to transmit useful information to Fred or anyone else, even those users not involved in the mail loop.

It is important to note that this exemplary maelstrom consists entirely of actions that, as far as any single user knows, are perfectly safe. The maelstrom only occurs when forwarding steps are connected in a loop. In a distributed forwarding network, no single user has access to sufficient information about the network to detect a loop before the message is actually sent. Therefore, in principle, every automatic message forwarding process potentially is the cause of an unforeseen and devastating network breakdown.

The above described scenario is an example of the simplest type of maelstrom. One may further identify subclasses of maelstroms as follows.

1. Simple maelstroms. This type of maelstrom relates to automatic message forwarding in a distributed network, in which each agent forwards incoming messages verbatim to a set of other agents. The set of destinations is different for each sender agent, and may also depend on the header or content of the message, or on other factors such as time of day, etc.

2. Additive maelstroms. This type of maelstrom is a more complex form of automatic message forwarding, in which additional information is added to the message before forwarding. This additional information may be of any nature from the most insignificant, such as a blank line added to the bottom of the original message, to the most significant, such as a complete disavowal of the original message by its original author.

3. Combinatorial maelstroms. This type of maelstrom relates to several messages or parts of messages that are combined to form a single new message prior to forwarding. One example is an automatically generated, personalized newspaper that can be received by an agent and, in turn, used by the receiving agent in whole or in part as content for its own automatically generated newspaper.

4. Maelstroms with finitary transformation. As the message is forwarded from agent to agent, it can be transformed into a succession of variations of which there are a finite (usually small) number of types. Examples of this type of variation include conversion of the message to all capital letters or to all lower case letters, adding or removing a final blank line, or applying a simple character encoding such as one known as "rot13."

5. Maelstroms with arbitrary transformation. This type of maelstrom is the most general case, in which agents may transform incoming messages in arbitrary ways before forwarding.

One previous approach to preventing an occurrence of chain reactions in networks was based on inserting identifiers into header fields of messages. One such approach was proposed by U. Manber, Chain reactions in networks, Computer, pages 57–63, October 1990. In the Manber technique the system assigns a unique ID to each newly generated message in the network. This ID is inserted into the header of the message prior to forwarding. At each forwarding step the message, however transformed, retains its original ID. All agents maintain a list of all IDs of messages sent, against which every incoming message is checked. If the ID of an incoming message is found in the list, it is not forwarded. When this technique is strictly adhered to, no message is forwarded twice by any agent and, as a result, no maelstrom can occur.

A second approach that the inventors are aware of was proposed specifically for email messages. In this case, instead of assigning a single, unique ID to each message, each agent inserts its own unique ID into the header of each message that it sends. When it receives a message, the agent searches the header message for its own ID. If the ID is found, then it does not forward the message. This prescription also prevents maelstroms, but may fail to detect multiple copies of a single message that have reached an agent for the first time along distinct paths. The agent is incapable of recognizing that the incoming messages are duplicates. All it recognizes is that none of them contains its ID, and each copy is forwarded independently.

While ID-based approaches such as these can be effective in certain contexts, there are several important cases under which the general concept of deliberately inserting a unique identifier of some sort into a message is either inappropriate or ineffective.

A first case arises if the agent that is performing the forwarding operation is written as an add-on to an existing system. In this case the agent may not have write access to the messages (especially the header area). As such, it is incapable of inserting or manipulating IDs in the header area.

A second case arises if the message is transmitted to other domains that employ protocols other than the one used to encode identifiers. In such situations the message header containing the inserted ID may be lost in the translation. When the message is reinjected into the system that checks for the identifiers, it is treated as a new message, despite the fact that it is not, thereby reinitiating the maelstrom.

A third case arises if the agent modifies the message in a way that is important to some of the other agents in the network, but unimportant to others. In this case, only those agents to whom the modification is important should resend the modified version. The identifier method prevents this from occurring, or at best severely limits it.

Finally, a fourth case where the ID technique may be ineffective is where an agent wishes to ignore some types of modification and pay attention to others when it decides whether to forward a modified version of a message. As in the previous third case, the identifier method prevents or severely limits this from occurring.

These and other scenarios involving maelstroms resulting from automatically generated messages are more likely to plague networks, particularly as intelligent agents become more sophisticated and come into wider use. Given the multiplicity of different networks, protocols, mail systems, etc., that interoperate in modern global communication networks, prior techniques for preventing maelstroms that impose the requirement that a unique message ID be associated with each message or each sender are unlikely to be effective.

The third and fourth cases given above illustrate an important reason why this is so. Most simply, the identifier method effectively prescribes a fixed convention to be applied to all messages modified in any way by any agent. For example, U. Manber's scheme requires that the forwarded message, however modified, have the same identifier as the original, or at most an identifier that is one of a predefined, strictly limited set of variants of the original identifier. One consequence of this is that it severely limits extensive "conversations" (i.e., series of automatically generated messages passing between two agents) without human intervention. The other technique referred to above, on the other hand, requires that the modified message always be treated as entirely new. This prevents the agents from ignoring trivial changes or exploiting useful ones in a message as it propagates through the network.

Furthermore, the decision of "same" or "different", which determines whether the original ID is preserved or a new ID is generated, is made once and for all by the sender agent prior to transmission. This prevents the sort of contextual, individualized, automated decision-making that is one of the central benefits of using intelligent agents in the first place.

OBJECTS AND ADVANTAGES OF THE INVENTION

It is thus an object and advantage of this invention to provide a general, robust procedure for preventing maelstroms in networks.

It is another object and advantage of this invention to provide an improved procedure for preventing maelstroms in networks that may employ a variety of message protocols, wherein at least some of the message protocols are well-established and unlikely to be modified to explicitly incorporate maelstrom prevention themselves.

It is a further object and advantage of this invention to provide a general, robust procedure for preventing maelstroms in networks in which messages can be augmented, transformed and/or combined.

SUMMARY OF THE INVENTION

The present invention is a general, robust method for preventing maelstroms in computers and computer networks populated by entities capable of generating messages in response to other messages.

The method includes equipping entities that automatically generate messages with a message recognition extractor procedure that, for each such message received or sent by the entity, automatically extracts information from the message that will allow a message of identical or similar content to be recognized in the event that it is subsequently received by that entity. The method further includes checking incoming messages against the stored recognition information to identify messages that are likely to be identical to or similar to a message that has previously been received or sent by that entity, and preventing the occurrence of automatic message forwarding if identity or sufficient similarity is detected, either by 'silently' preventing message generation and forwarding, or by giving the user or the user's agent a choice to permit or disallow the message generation.

In one embodiment of the invention, the message recognition extraction procedure extracts one or more signatures from the message, using an automatic signature extraction procedure. The extracted information may also include one or more checksums.

In another embodiment of the invention, messages are filtered prior to automatic signature extraction in such a way that the most common insignificant variations among messages are removed. In this manner the message may be considered to be compressed by the removal of the insignificant variations. Specific types of filtering include, but are not limited to: removing all header data; removing multiple consecutive whitespace characters; removing all non-alphanumeric characters; and/or mapping all characters to upper case or to lower case.

In a further embodiment, messages may be filtered prior to automatic signature extraction in such a way that special data such as inclusions, attachments, or non-textual data is identified and/or treated specially, such as being treated as an indivisible unit.

In a further embodiment, in which the messages are electronic mail (e-mail), the recognition step may include recognition of key phrases that are likely to indicate prior forwarding (e.g. header tags imbedded in the body of the e-mail).

This invention thus pertains to a digital data processing system, to methods executed by a digital data processing system, and pertains as well to a computer program that can be embodied on a computer-readable medium for providing a mechanism to prevent an occurrence of a maelstrom.

This invention provides an information extracting portion or step for extracting information from each message processed by an entity and that may potentially be forwarded to another entity, where the extracted information permits that message or a similar message to be recognized, as well as a storage portion or step for storing the extracted information in a database of extracted information. The database has the extracted information for each message stored in an entry associated with the message. The invention further provides a comparison portion or step for comparing each message received or possibly originated by the entity against the database entries stored in the storage segment and, if an entry is found to be sufficiently similar to the received message, for preventing the received message from triggering the generation and forwarding of a new message, thereby avoiding the creation of a network chain reaction or a maelstrom.

Transforming the message to an invariant form includes attempting to identify at least one of an inclusion, attachment or non-textual data within the message as being a special block of the message. Thereafter, the special block is considered as being an indivisible unit when extracting the information.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 illustrates summary generation, wherein FIG. 4A shows a message in its original form, and FIG. 4B depicts a summary generated from the message;

FIG. 5 illustrates forwarding decisions, wherein FIG. 5A shows a case wherein an additional message piece is insufficient to constitute a new message, while FIG. 5B depicts a case wherein the additional message piece is regarded as being sufficiently important for the entire message to be considered a new message;

FIG. 7 illustrates a transformation to an "invariant" form, wherein FIG. 7A depicts the original message, and FIG. 7B illustrates the invariant form of the transformed message;

DETAILED DESCRIPTION OF THE INVENTION

Figure 1:
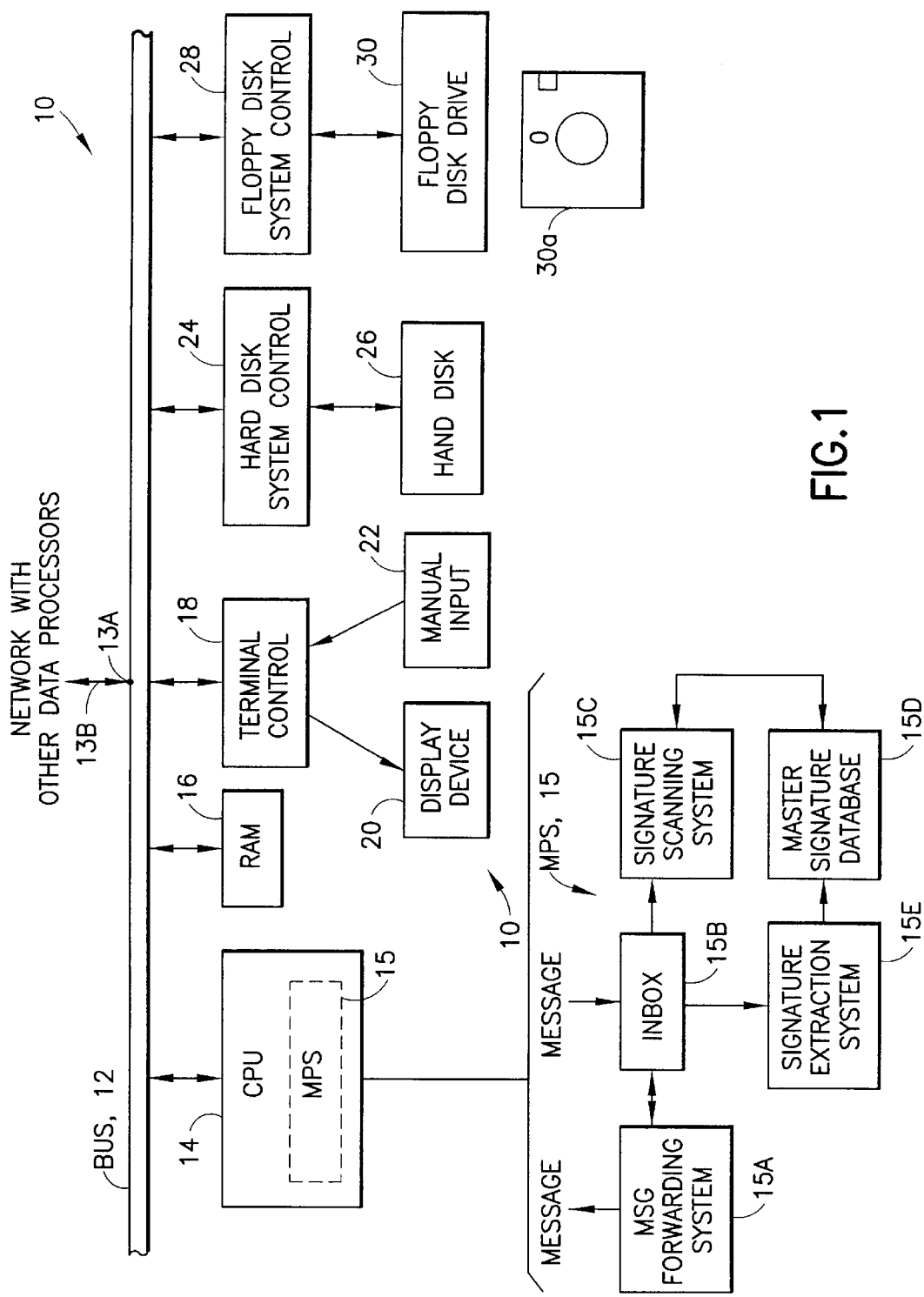
FIG. 1 is a block diagram of a computer that is suitable for practicing this invention.

FIG. 1 is a block diagram of a system 10 that is suitable for practicing the teaching of the present invention. A bus 12 is comprised of a plurality of signal lines for conveying addresses, data and controls between a central processing unit (CPU) 14 and a number of other system bus units. A random access memory (RAM) 16 is coupled to the system bus 12 and provides program instruction storage and working memory for the CPU 14. A terminal control subsystem 18 is coupled to the system bus 14 and provides outputs to a display device 20, typically a CRT monitor, and receives inputs from a manual input device 22, such as a keyboard or pointing device. A hard disk control subsystem 24 bidirectionally couples a rotating fixed storage medium, such as a hard disk 26, to the system bus 12. The control 24 and hard disk 26 provide mass storage for CPU instructions and data. A removable medium control subsystem, such as a floppy disk system control 28 along with a floppy disk drive 30, is useful as an input means in the transfer of computer files from a floppy diskette 30a to system memory via the system bus 12.

For the purposes of this invention the system 10 is assumed to include some device, such as a modem or a network adapter 13A, for coupling the system 10 to a communications network 13B such that messages can be received from other data processors and such that messages can be transmitted to other data processors. The communications network 13B may be a local area network (LAN) or a wide area network (WAN), and/or could provide access to the Internet and the World Wide Web (WWW).

The components illustrated in FIG. 1 may be embodied within a personal computer, a portable computer, a workstation, a minicomputer or a supercomputer. As such, the details of the physical embodiment of the data processing system 10, such as the structure of the bus 12 or the number of CPUs 14 that are coupled to the bus, is not crucial to the operation of the present invention, and is not described in further detail below.

In accordance with this invention the system 10 further includes a message processing system (MPS) 15, shown for convenience as forming part of the CPU 14. The message processing system 15 will be shown below to include a message forwarding system 15A, a message inbox 15B, a signature scanning system 15C coupled to a master signature database 15D, and a signature extraction system 15E.

A presently preferred embodiment of the invention is now described with reference to FIG. 2. It is first noted that the system 10 embodying this invention is assumed, for the purpose of describing the invention, to be in use in an environment having one or more (preferably many) electronic mail users. An ability to send and receive electronic mail is not, however, a limitation on the practice on this invention, as a variety of different message types could be sent and received, such as messages sent between two computers without any user intervention.

Figure 2:
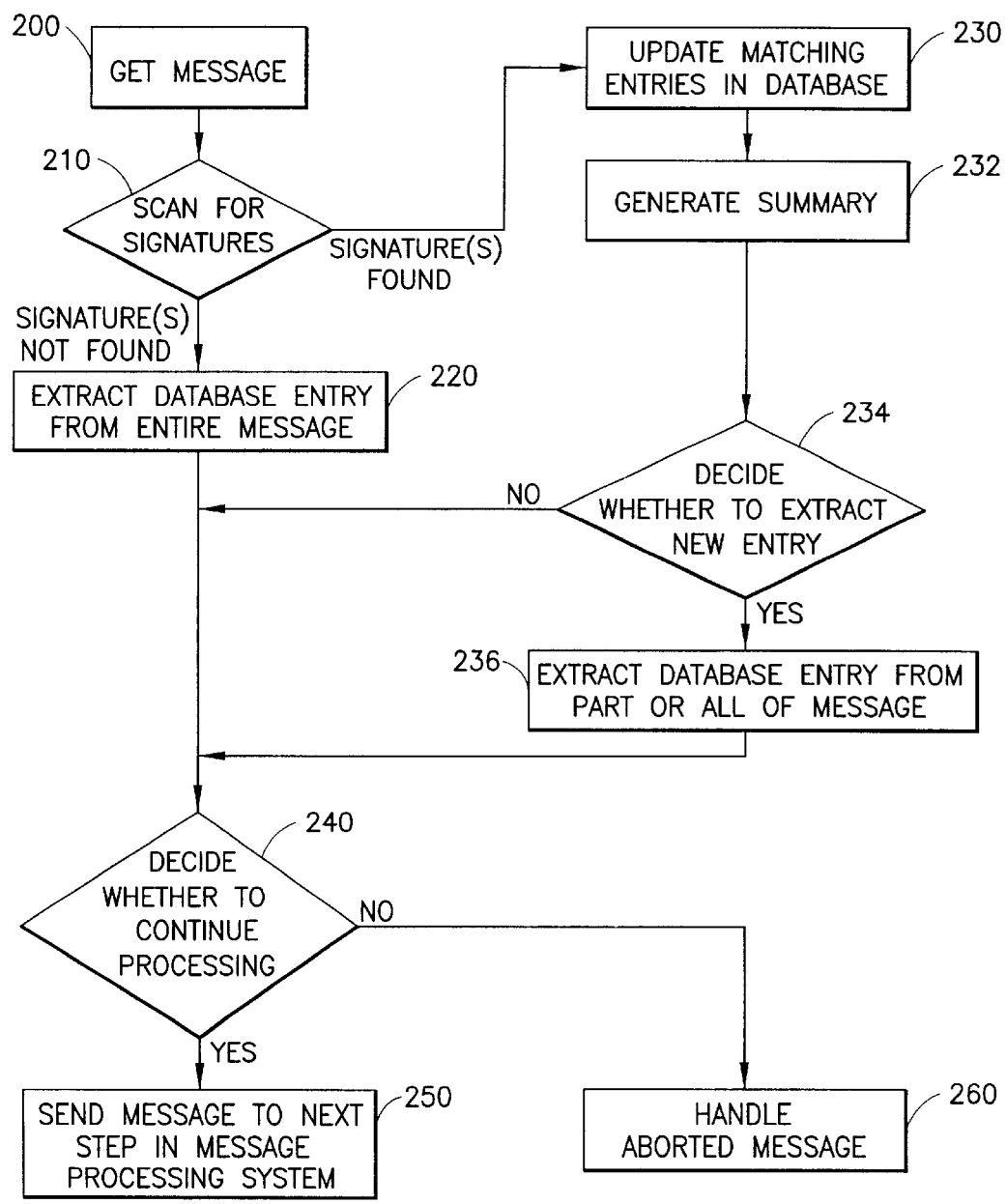
FIG. 2 is an overall logic flow diagram of a method in accordance with this invention.

It is further noted that FIG. 2 illustrates the invention as it may be applied at any stage of the information (message) processing stream.

Figure 9:
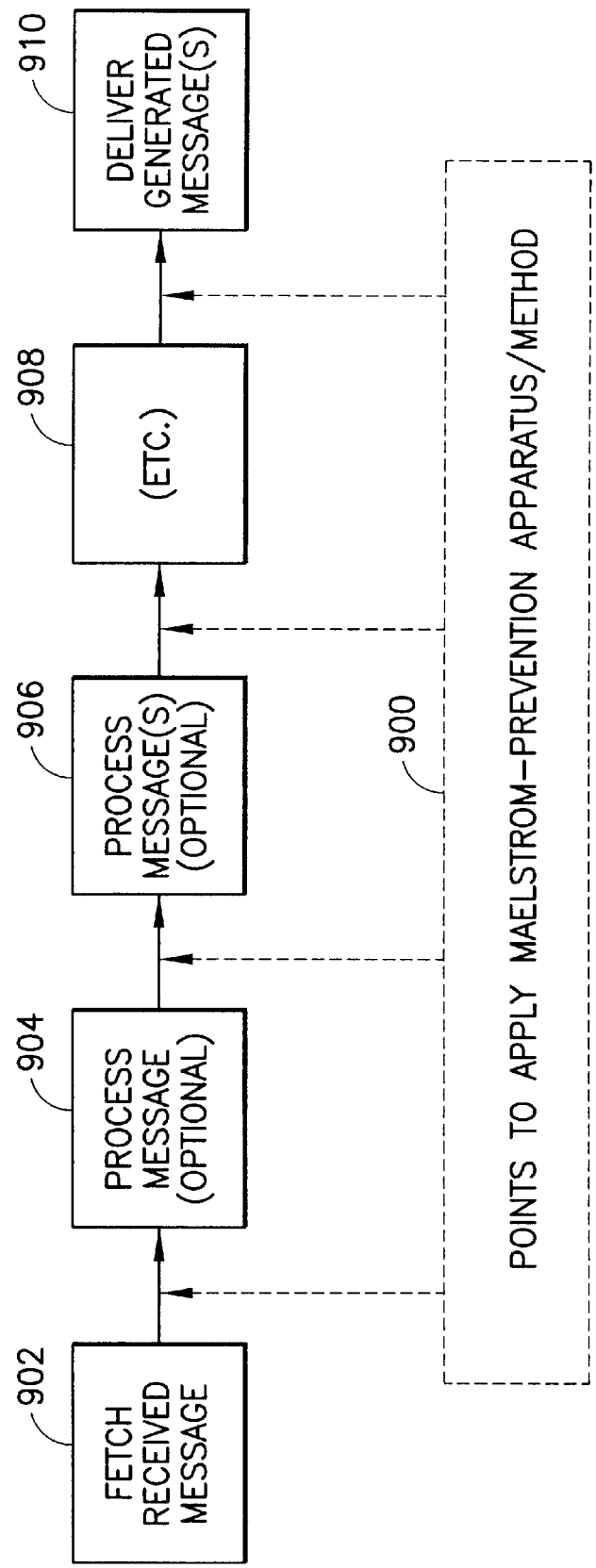
FIG. 9 is a diagram of a representative message processing system/method, and illustrates various points at which the maelstrom prevention apparatus/method, in accordance with this invention, may be applied.

For example, FIG. 9 is a diagram of a representative message processing system/method, and illustrates various points at which the maelstrom prevention apparatus/method, in accordance with this invention, may be applied. In general, the maelstrom prevention apparatus/method of this invention can be viewed as a module 900 that may be inserted at any point in the message processing stream of an entity. That is, assume that the message processing system or method includes any number of processing steps, beginning with fetching a received or originated message 902, any number of message processing modules or steps 904–908, and ending with forwarding, sending or delivering the generated message(s) 910. The maelstrom prevention apparatus/method module 900 may be applied to the received message, to the generated message(s), to any of the intermediate forms the message takes on during processing, or to any combination of these.

For example, the teachings of this invention can be applied to all received messages when a user wishes to set up an email system to flag, delete, or otherwise specially treat all messages that have been received before.

Another example of where the invention can be applied is to an intermediate message processing step in a message forwarding system that first determines whether a message is eligible for forwarding (e.g., by examining the subject line for keywords such as "Joke"), and then forwarding the message verbatim. In this case, the invention embodied in the module 900 can be applied after a message is determined to be eligible, but before it is forwarded.

Another example of where the invention can be applied is to generated message(s) in a "lossy" message processing system in which many different received messages trigger the same generated message, e.g., a text summarizer.

It can be appreciated that some message processing systems would benefit from applying the invention embodied in the module 900 at more than one point in the processing stream. If this is done, there may be separate master signature databases 15D for each such point of application, or they may be combined into one unified master signature database.

In general, the messages processed by this invention may be originated at the entity doing the processing, such as by direct user input, as well as messages received from an external source and messages generated as a result of received messages. A "generated message" may thus be considered as one to be output from the entity to an external message sink, a "received message" may be considered as one that is input from an external message source, and an "originated message" may be considered as one that is created or composed at the entity, either by user input (such as an email message) or automatically during the operation of the entity (such as a system diagnostic message). As such, generated messages may also be referred to as "outgoing messages", while both originated and received messages may be collectively referred to herein as "incoming messages".

The teachings of this invention are also considered to pertain to messages that are originated by, received from, and generated for so-called intelligent software agents, such as those capable of autonomously or semiautonomously operating in a data communications network such as the Internet.

Returning now to FIG. 2, in general the system or method in accordance with this invention obtains a message, scans for signatures, extracts signatures, and determines whether to continue or to abort the processing of the message. If the decision is to continue, the message is sent on to the next step in the information processing stream (which could be, for example, a step of further processing, or a step of forwarding or delivering the message). If the decision is to abort, the message is not sent on to the next step in the information processing stream, and any appropriate action(s) are taken.

In greater detail, at Step 200 a message is retrieved or received and/or copied for processing by the message forwarding system 15A. Messages may be retrieved from the user's inbox 15B or from other specified folders if the user so desires, or messages may be originated by the user. New messages may be retrieved periodically or in response to a request by the user or some other event, and may be retrieved at different times and under different circumstances for different users. Control then passes to the signature scanning system 15C at Step 210.

At Step 210, the message is scanned for the presence of any signatures contained in the master signature database 15D. If the message does not contain any recognized signatures, control passes to Step 220, in which the automatic signature extraction system 15E applies a procedure to the message. This procedure extracts one or more signatures that are highly unlikely to be found in other messages, as will be described in further detail below. As employed herein a signature may comprise one or more patterns of characters, referred to also as a signature pattern (see also FIG. 3), which are found in the message itself or in a processed version of the message, and which may be augmented with additional information such as checksums of the entire message and/or portions of the message, checksums derived from one or more transformations of the message, the sender's identity, the time at which the message was received ("time last seen"), etc. All such signature pattern(s) and auxiliary data are stored as a new entry in the master signature database 15D. The message itself, or some portion thereof, may also be stored for future reference. A decision is then made, at Step 240, whether to continue processing the message. If the decision is to continue, the message is then sent at Step 250 to the next step or stage in the message processing system, which could be message forwarding system 15A, or alternatively some additional message processing step. Assuming for this example that the next step or stage is the message forwarding system 15A, the message is forwarded by the message forwarding system 15A to a designated set of recipients (Step 250). The recipients may be designated in advance or may be selected according to characteristics of the message.

For example, Step 240 may apply keyword-based or other automatic feature extraction methods to the portions of the text that do not match any entry in the master signature database 15D. Two examples of this are shown in FIGS. 5A and 5B. By example, the presence of either (or both) of the words "attention" or "rescheduled" may be treated as keywords which will automatically cause the message to be forwarded (as may, for example, two or more occurrences of a certain word, such as "attention").

If the decision of Step 240 is not to continue processing, control passes to Step 260, in which postprocessing of the message is applied. This may entail doing nothing at all, recording the arrival of the message in a separate database, altering the appearance of the message in the user's inbox 15B (for example by annotating or colorizing it), storing the message in a special folder for nonprocessed messages, deleting the original message from the user's inbox 15B, etc. Preferably, the details of the response to the nonprocessed or nonforwarded message are customizable by the user.

If, in Step 210, one or more matching signatures are found by the signature scanning system 15C, control passes to Step 230 where the database entries for which a matching signature was found are updated in the master signature database 15D. The updating operation can comprise, by example, a step of resetting the field containing the time last seen to the arrival time of the present message.

Control then passes to Block 232 where a summary of the message is generated that identifies which portions of the message matched to which entries in the master signature database 15D. This may take the form of replacing each block of text matching a signature with a short identifier for that signature. A sample message and an example of a summary of the sample message are shown in FIGS. 4A and 4B, respectively.

Note that in this example the new portion of the message has been simplified by removing punctuation and placing all characters in the same case (lower case in this example), and the actual message of interest has been replaced with an identifier of the message (i.e., this is a copy of message 140343 which was originally received on Sep. 9, 1998 from user Hanson).

At Step 234, a decision is made as to whether a new entry in the master signature database 15D should be generated for (extracted from) the message by the signature extraction system 15E. This decision may be based on, for example, storage and/or performance constraints, the degree to which the message contains text different from or in addition to the portions matching entries in the master signature database 15D, etc. If not, control passes to Step 240, which functions as described above. If, on the other hand, the decision of Step 234 is to extract a new database entry, control passes to the signature extraction system 15E at Step 236, where one or more signatures are extracted and an entry is generated in a fashion similar to Step 220. One difference from the operation at Step 220 is the possibility of using only part of the message for signature extraction. For example, if the message contains one or more large blocks of text that did not match any signature, the entry may be generated from these blocks rather than from the entire message. After extracting and storing the new entry for the master signature database 15D, control passes to Step 240 to determine whether to continue processing or to abort the processing of the current message, as described above.

Figure 3:
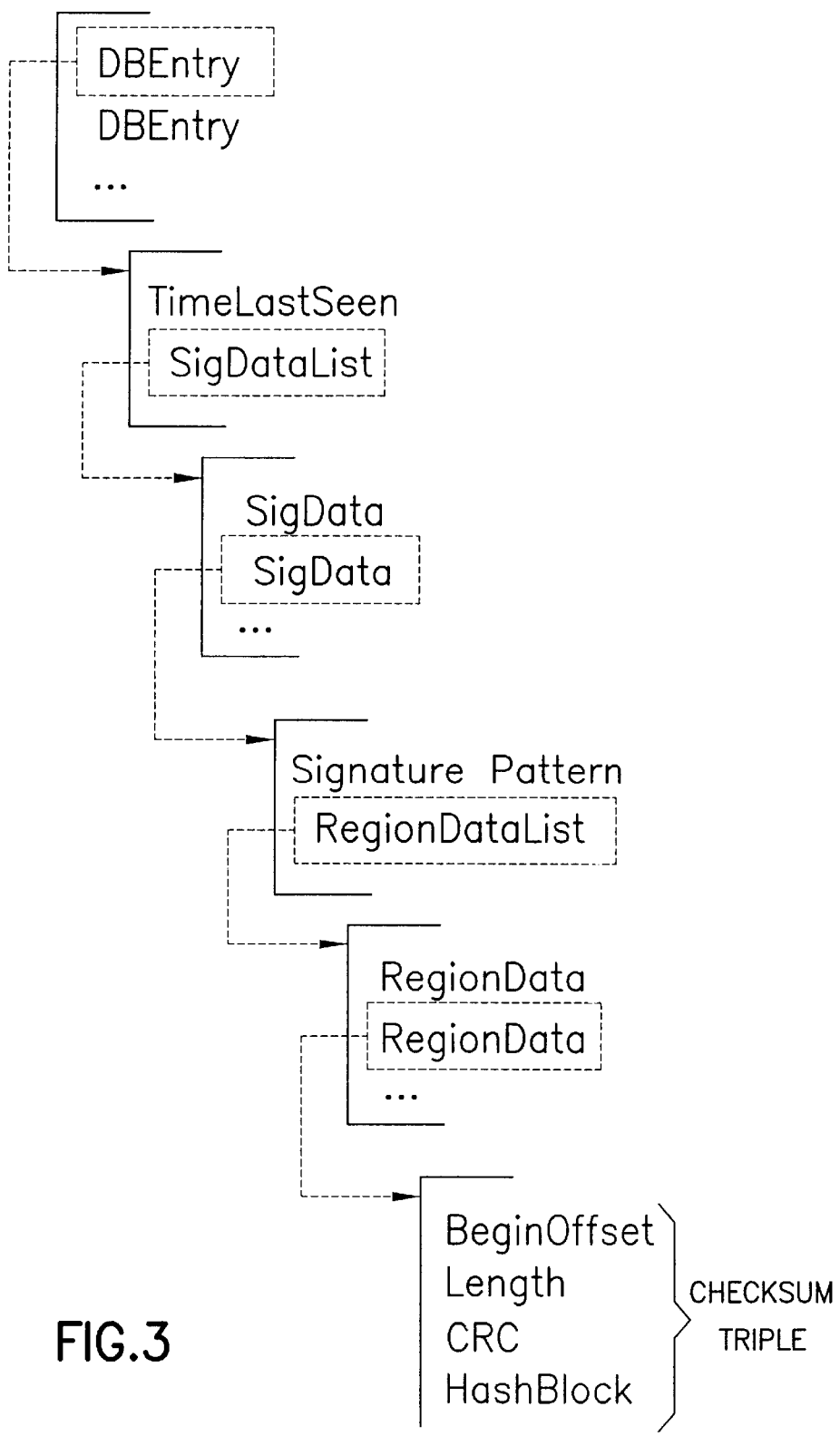
FIG. 3 depicts the organization of a presently preferred data structure for a master signature database.

A presently preferred data structure for storage in the master signature database 15D is illustrated in FIG. 3. The master signature database 15D stores entries of type DBEntry. Each DBEntry, in turn, is composed of elements TimeLastSeen and SigDataList. TimeLastSeen is initialized to the arrival time of the message that caused the entry to be created, and is thereafter updated with the arrival time of every message that matches the entry. SigDataList is a list of SigData elements.

Each SigData element is composed of a Signature Pattern and a RegionDataList. The Signature Pattern is a sequence or pattern of characters extracted from the message or a transformed version of the message, chosen in such a way as to minimize the likelihood that a different message would contain the signature pattern as well. In the presently preferred embodiment of this invention the Signature Pattern is a character sequence that is to be matched exactly, or with some number of mismatches (which may also include wildcards), to the different message. The RegionDataList is a list of RegionData elements.

Each RegionData element is composed of four parts, designated BeginOffset, RegionLength or simply Length, CRC, and (optionally) HashBlock. The Beginoffset, Length and CRC may be collectively referred to below as a 'checksum triple'. The BeginOffset gives the number of characters between the beginning of the region and the signature pattern embedded in the region. The Length gives the number of characters in the region. The CRC is a checksum of the character sequence in the region. The HashBlock is a block of data computed from the region, which is preferably used to measure the overall similarity between the region and portions of other messages. Details of a preferred process of generating and using the HashBlock data are given below.

Figure 6:
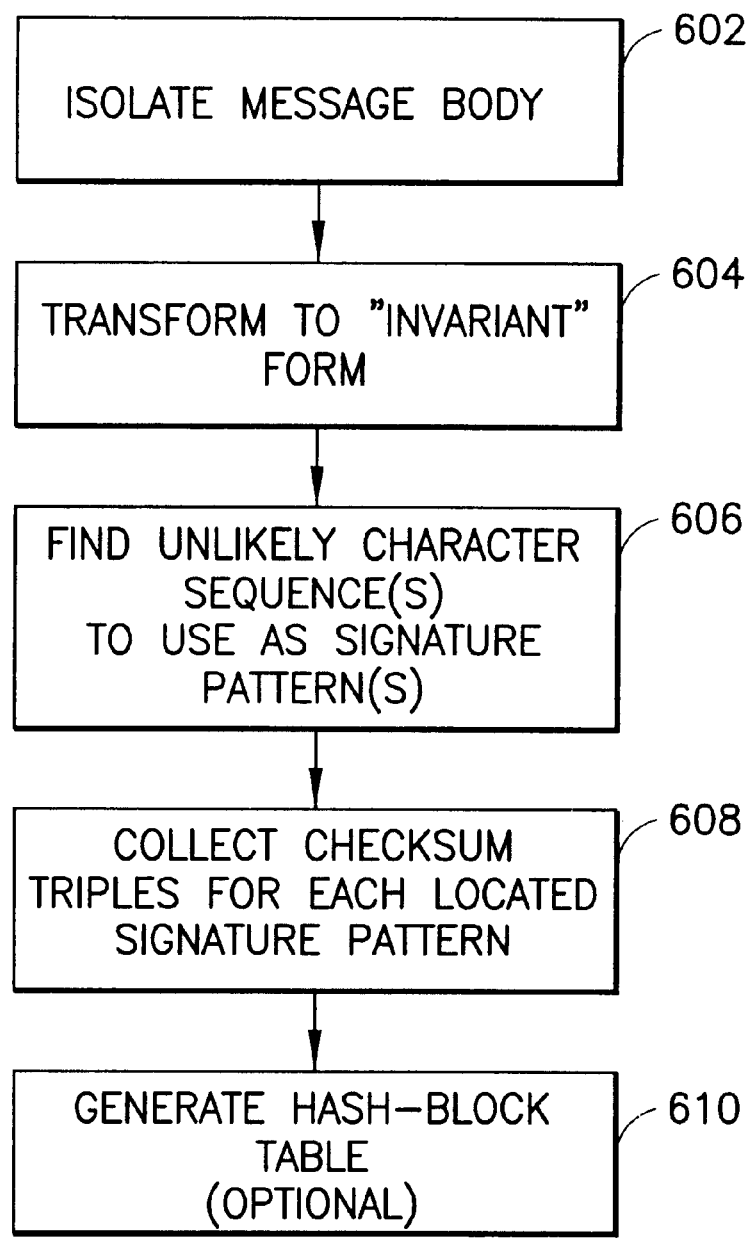
FIG. 6 is a logic flow diagram showing a signature extraction procedure.

A preferred embodiment of the automatic signature extraction procedure used in Steps 220 and 236 of FIG. 2, as carried out by the signature extraction system 15E of FIG. 1, is now described with reference to FIG. 6. At Step 602, the body of the message from which the signature is to be extracted is isolated from the message. At Step 604, the extracted body is transformed into an "invariant" or substantially invariant form by, for example, replacing all blocks of contiguous whitespace characters with a single space character, removing all other non-alphanumeric characters, and replacing all upper-case characters with their lower-case counterparts. Reference in this regard can be had to the exemplary original message shown in FIG. 7A, and then to the transformed, invariant form of the same message shown in FIG. 7B. The removal of some portions of the message, such as contiguous whitespace characters, may be considered to be a compression of the message.

In the transformation to invariant form, and as will be discussed in further detail below, the message may also be scanned for blocks of special data, such as inclusions, attachments, or non-textual data, and these blocks of data may be incorporated into the body of the message itself, with or without special flags indicating their presence. An example of a block of included text is shown in FIG. 4A, in which the inclusion is indicated by the presence of a "<" at the beginning of each line. For the purposes of signature extraction and scanning, blocks of special data may be treated as being part of the message body and handled as ordinary data, or may be treated as indivisible units. If the latter, checksums and other auxiliary signature data are taken over the block as a whole.

Referring again to FIG. 6, at Step 606 one or more patterns of characters that are very unlikely to be found in a typical message are identified, and the one or more identified patterns constitute the signature pattern or signature patterns. The identification of unlikely character patterns, more specifically character sequences, can be carried out by the method described in commonly assigned U.S. Pat. No. 5,452,442 to Kephart, "Methods and Apparatus for Evaluating and Extracting Signatures of Computer Viruses and Other Undesirable Software Entities", the disclosure of which is incorporated by reference herein in its entirety, although other techniques could be used as well. The technique disclosed in this commonly assigned U.S. Patent was originally applied to the automatic extraction of computer virus signatures. Briefly, and in accordance with Kephart's signature extraction technique as applied to the processing of messages in accordance with the teachings of this invention, a large corpus of mail messages (for example, those stored in the user's mail archive or database) is characterized statistically. Several candidate signature patterns taken from the messages are selected, and for each candidate signature pattern the corpus n-gram statistics are used to estimate the likelihood for each candidate signature pattern to appear in a random, ordinary mail message. The candidate signature pattern or signature patterns with the least likelihood of appearing in an ordinary mail message are selected.

In greater detail, and further in accordance with Kephart's signature extraction technique as applied to the processing of messages in accordance with the teachings of this invention, the CPU 14 of FIG. 1, in particular the signature extraction system 15E, accesses a stored corpus of messages that are representative of messages processed by the system, and is then provided a message that is currently being processed, and which has at least one portion comprised of a sequence of bytes that are likely to remain substantially invariant from a first instance of the message to a second instance of the message. A next step selects at least one candidate signature pattern of the message from the sequence of bytes and constructs a list of unique n-grams from the sequence of bytes. For each of the unique n-grams, the signature extraction system 15E estimates a probability of an occurrence of the unique n-gram within sequences of bytes obtained from the stored corpus of messages. For each candidate signature pattern that is comprised of one or more of the unique n-grams, a next step estimates a false-positive probability of an occurrence of the candidate signature pattern within the sequences of bytes obtained form the corpus of messages, followed by a step of comparing the estimated false-positive probabilities of the candidate signature patterns with one another and with a set of threshold probabilities, the threshold probabilities having values selected to reduce a likelihood of an occurrence of a false-positive indication during the use of any signature pattern with a false-positive probability less than the threshold. The step of comparing includes steps of discarding any candidate signature patterns for which an occurrence of a predetermined number of selected bytes is more common than a predetermined threshold; evaluating an exact-match probability for remaining candidate signature patterns; and discarding any candidate signature patterns having an exact match false-positive probability that is above an exact match threshold. The signature extraction system 15E retains candidate signature patterns having the lowest estimated probabilities. For each remaining candidate signature pattern i, the method evaluates an m-mismatch false-positive probability, starting with m=1, and increments m until the false positive probability exceeds an m-mismatch threshold, setting $M_i$=m−1. For all candidate signature patterns that correspond to a particular message, final steps of this method select as one or more best signature patterns those having a largest value of M; and stores each of the one or more selected best signature patterns for each message as an entry in the signature database 15D, along with the other related data, for subsequent use in identifying an instance of the message or a modified version of the message.

Taken together, Steps 602, 604, and 606 describe the signature pattern selection procedure in its simplest form. optionally, some auxiliary signature data may be collected to reduce the false-positive rate further. At Step 608, the following procedure is applied to each located signature: one or more character strings that contain that signature pattern are checksummed using any convenient method (preferably, the checksum is at least 32 bits), and the checksum, the offset of the beginning of the checksummed sequence, and the length of the checksummed sequence containing the signature pattern are recorded in the signature database 15D as the above-mentioned checksum triple.

The region(s) over which the checksums are taken may be concentric regions of a range of increasing sizes p to the size of the message itself. Such regions may be restricted to lie within a specified part of a message, or may be restricted to cover an entire block of data, such as a region of special data identified by the step of transformation to invariant form, or may be determined in some other way.

A further refinement may be added optionally. At Step 610, a locality-preserving hash function can be applied to all or a portion of the message body, and the hash or hashes may be recorded along with the signature data. This hash function is described in greater detail below.

Figure 8:
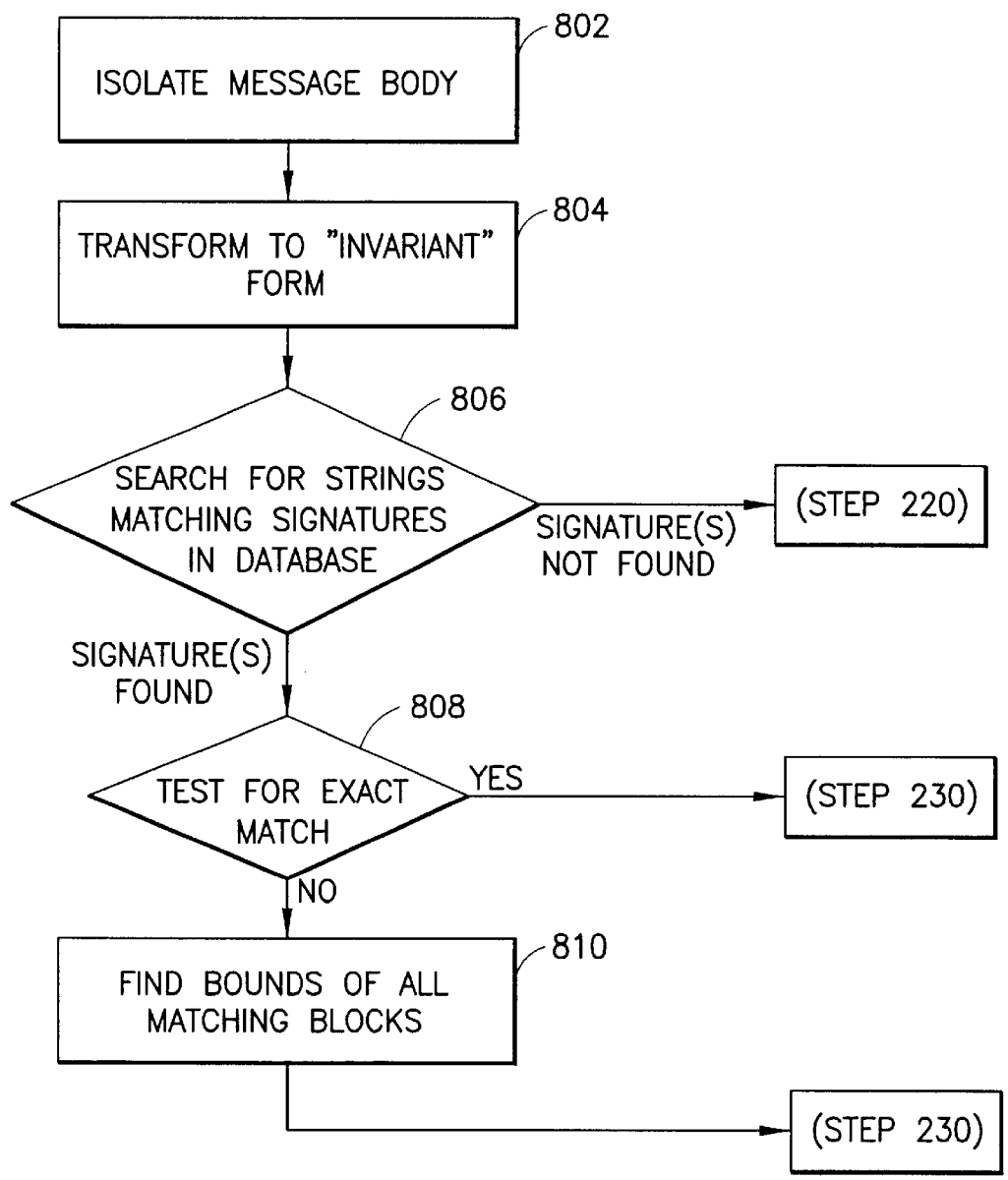
FIG. 8 is a logic flow diagram of a signature scanning procedure.

A preferred embodiment of the scanning procedure carried out by the signature scanning system 15C of FIG. 1 is now described with reference to FIG. 8. In Steps 802 and 804, the message to be scanned is transformed into the same invariant form as was applied at Steps 602 and 604 (see, again, FIGS. 7A and 7B). Then, in Step 806, the invariant form of the message is scanned for the presence of any of the signature patterns in the signature database 15D. If no signature patterns are found, the message is deemed "new", and control passes to Step 220 of FIG. 2. If one or more signature patterns are found, control passes instead to Step 808.

At Step 808, an exact match may be claimed if the checksum, signature offset and length of the entire message are precisely equal to one of the checksum triples associated with the signature. Otherwise, control passes to Step 810, where checksum triples are checked against the corresponding portions of the message, in the order of decreasing length of the portion. A partial match is claimed as soon as a matching checksum triple is found. If there are no matching checksum triples, then the length of the partial match is taken to be equal to the length of the character sequence in the message that matches the signature pattern.

In any case, the result of the scan is the identification of blocks of text in the message that match entries in the master signature database 15D, in particular the BeginOffset, Length and CRC checksum triple of the RegionData of a particular DBEntry (see, again FIG. 3). This information, along with the original message, is used by the summary generation procedure (Step 232 of FIG. 2).

A preferred method of generating and using the Hash-Block data structure mentioned above is now provided. It will be remembered that the HashBlock is an (optional) portion of the RegionData element of a DBEntry in the signature database 15D (see, again FIG. 3).

The HashBlock data of a RegionData element is generated during the creation of a database entry (steps 220 and 236 of FIG. 2), at a point after the Signature Pattern and checksum triple fields have been set. First the message is transformed, possibly but not necessarily in the same way as the transformation to "invariant" form used in the signature extraction procedure. Then the message is subdivided into small individual units that may or may not overlap. For example, the units may be the individual words of the message, or the set of all character sequences of some fixed length. For each unit, a hash function maps the unit onto a small integer hash value, and a count associated with that hash value is incremented.

Optionally, after the counts are tallied, the count associated with each hash value may be transformed such that similar counts are mapped to similar values. An example of such a transformation is to replace each count with the remainder of that count upon division by 16, or some other power of two. Transformations such as this can reduce the amount of storage consumed by the HashBlock, while still preserving the property that very similar messages have very similar HashBlocks.

The array of all such counts is stored as the HashBlock data, which therefore is composed of a histogram of the number of times each hash value occurred in the region.

In one embodiment of the invention, the HashBlock data is used as part of the decision of whether or not to continue processing or to forward a message containing signature(s) matching entries in the signature database 15D (see Step 240 of FIG. 2). The presently preferred use of the HashBlock data is as follows.

A HashBlock array is generated for the new message and is compared with that of the original message in one or more ways, used separately or in combination.

One such comparison is the Hamming distance between the two arrays. For two HashBlock arrays A and B of length n with elements $a_i$ and $b_i$, this is given by (for the non-transformed case referred to above):

$$\|A - B\| = \sum_{i=1}^{n} |a_i - b_i|.$$

For the transformed case referred to above, and assuming modulo 16, the expression is given by:

$$\|A - B\| = \sum_{i=1}^{n} (a_i - b_i + 16).$$

Those HashBlock arrays with a Hamming distance that falls below a given (preferably user determined) threshold may be considered to correspond to unimportant changes in the message.

In a second comparison between HashBlock arrays, elements in which the arrays for the new and original message differ are used to effect an approximate identification of the parts of the new message that differ from the original. Note that if the original message was saved in its entirety, this reconstruction may be performed in an exact manner without the use of the HashBlock. The partial reconstruction method thus pertains to situations in which the original message was not saved, so that only the database entry is available for comparison.

First, the list of checksum triples is used to find the largest block of text that contains a matching signature and exactly matches one of the checksums. This puts an approximate bound on the region in which the new message differs from the original message.

Then, for each HashBlock array element in which the counters for the original and new array differ, a list of words is generated that both (a) are words that are mapped onto that element and (b) occur in the modified region of the new message. These words may then be annotated as "suspect" in the new message, and heuristic methods may be applied to the annotated message to determine the significance of the possible changes. For example, if most or all of the suspect words fall in a contiguous sequence, this would indicate a phrase that was added to the original. This phrase may then be checked for common features such as dates, times, the presence of predetermined words (e.g., 'attention', 'reschedule', etc.)

The TimeLastSeen field of entries in the master signature database 15D may be used to keep track of how "current" entries are, with a view toward periodically deleting from the database those entries determined to be 'out of date'. For example, this may be done using simple thresholding in such a way that entries for which the TimeLastSeen field stores a date further in the past than some fixed (or user definable) threshold are deleted. This technique prevents an unlimited increase in the size of the master signature database 15D.

It can be appreciated that it may be desirable to provide some degree of separation between multiple signatures that are extracted from a given message. That is, it may be desirable that the signature selection process be biased towards favoring sets of signatures and signature patterns that are located in different parts of the message. For example, assume up to some specified maximum number of signatures can be obtained from one message, which maximum number may be a predetermined fixed constant (e.g., 2), or which may depend on the message length or some other characteristic of the message. In accordance with a presently preferred technique the signature extraction system 15E first sets an "allowed region" to the portion of the message body from which signature patterns are to be extracted. The signature extraction system 15E then selects the "best" signature pattern from the allowed region. Next, the signature extraction system 15E removes the signature pattern and n bytes on either side of the signature pattern from further consideration. That is, the signature extraction system 15E disallows the selected signature pattern and the n bytes on either side of the signature pattern from further consideration for signature extraction, thereby effectively removing this portion from the allowed region. This technique continues until either no more signature patterns can be obtained from the allowed region, or the maximum number of signature patterns, and hence signatures, is obtained.

In general, various criteria can be used for choosing a maximum number of signatures that can be obtained form one message. By example, a first technique simply sets the maximum number of signatures equal to some constant (e.g., 2, as mentioned above), while a second technique equal to the message portion size divided by a constant (C):

Max#Sigs=MessagePortionSize/C, where C equals, for example, 500 or 1,000.

Exemplary criteria for determining an allowed separation between signatures could be:

(a) Separation=C1>SignatureSize; or (b) Separation=C2*SignatureSize, C2>1, where C1 and C2 are constants.

The invention has been described above in the context of a digital data processing system and methods for execution by a digital data processing system. Various parts of the invention could be implemented in hardware, or in software, or as a combination of hardware and software. Those skilled in the art will realize that the various logic flow diagrams of FIGS. 2, 6 and 8 could as well be viewed as circuit block diagrams illustrating interconnected processors and logic functions for implementing the various steps.

The same applies to FIG. 9, which may be viewed as interconnected hardware modules, or as interconnected process steps.

It should further be realized that this invention applies as well to a computer program that can be embodied on a computer-readable medium for providing a subsystem to prevent an occurrence of a maelstrom. In this case the computer program, embodied as described, contains an information extracting segment for extracting information from each message processed by an entity. The extracted information permits that message or a similar message to be recognized. A storage segment is provided for storing the extracted information in a database of extracted information. The database has the extracted information for each message stored in an entry associated with the message. The computer program also includes a comparison segment for comparing messages processed by the entity against the database entries stored in the storage segment and, if an entry is sufficiently similar to the message, for preventing the system from triggering the generation and forwarding of a new message, thereby avoiding the creation of a network chain reaction or a maelstrom.

Reference was made above to the processing of messages that include special data, such as attachments. It is noted that attachments are just one type of special data that may accompany a message or which may be embedded in a message. Examples of special data include the following.

(A) The above referenced attachments are a first type of special data, in which a body of data is attached to a message to be sent along with it, e.g. in the form of a separate file.

(B) Inclusions are a second type of special data, in which a body of data is included or quoted in a message, and which is often indicated by special markers such as a ">" or "–" or some other character or character string that is prepended to each line of the inclusion (see, again, FIG. 4A).

(C) A third type of special data is non-textual data, such as digitally encoded pictures.

This invention handles messages containing such special data in accordance with either or both of the following techniques.

A first technique is an "inline" technique, wherein the message and its special data are treated as if the special data were ordinary data located directly in the body of the message itself. In particular, for the purposes of signature scanning and signature extraction, special data are treated exactly as "ordinary" data.

A second technique is a "flagging" technique, wherein the special data is embedded in the message as in the inline method, except that the beginning and end of the special data are specially flagged (e.g. with a special marker character) and, during signature extraction, checksums, offsets, and other auxiliary data treat the special data as an indivisible unit. For example, signature(s) might be taken separately from the rest of the message, and/or the region over which checksums are taken might be restricted to be the entire block of special data.

Based on the foregoing description it should be apparent that while the invention has been particularly shown and described with respect to preferred embodiments thereof, it will be understood by those skilled in the art that changes in form and details may be made therein without departing from the scope and spirit of the invention.

What is claimed is:

1. A method of preventing maelstroms in computers and computer networks populated by entities capable of outputting messages automatically in response to incoming messages, comprising steps of:

for each message processed by an entity that has the potential to trigger an occurrence of a maelstrom, extracting information from the message for permitting that message or a similar message to be recognized;

storing the extracted information for that message such that it is accessible by the entity;

for each further message processed by the entity, comparing a currently processed message against the stored information for a set of messages that have been previously processed by the entity;

if the stored information for a previously processed message matches exactly to the information extracted from the currently processed message, preventing the currently processed message from triggering the generation of a new message; and if the stored information for a previously processed message similarly matches, but does not exactly match, the information extracted from the currently processed message, preventing the currently processed message from triggering the generation of a new message.

2. The method as in claim 1, wherein the step of extracting information includes a step of automatically extracting at least one signature comprised of at least one byte sequence contained in the message.

3. The method as in claim 1, wherein the step of extracting information includes a step of computing a checksum from one or more byte sequences contained within the message.

4. The method as in claim 1, wherein the step of extracting information includes a step of computing a hash function from one or more byte sequences contained within the message.

5. The method as in claim 1, wherein the step of extracting information includes a step of compressing information contained within the message.

6. The method as in claim 1, wherein the step of comparing includes a step of comparing at least one of a checksum or a hashblock table to determine an approximate identification of a portion of the currently processed message that may differ from the previously processed message.

7. The method as in claim 1, wherein the step of extracting includes a preliminary step of transforming all or a portion of the message to an invariant form.

8. A method as in claim 7, wherein the step of transforming to an invariant form includes a step of identifying at least one of an inclusion, attachment or non-textual data within the message.

9. A method of preventing maelstroms in computers and computer networks populated by entities capable of outputting messages automatically in response to incoming messages, comprising steps of:

for each message processed by an entity that may potentially be forwarded to another entity, extracting information from the message for permitting that message or a similar message to be recognized;

storing the extracted information for that message such that it is accessible by the entity;

for each further message processed by the entity, comparing a currently processed message against the stored information for a set of messages that have been previously processed by the entity; and if the stored information for a previously processed message is sufficiently similar to the information extracted from the currently processed message, preventing the currently processed message from triggering the generation of a new message, wherein the step of extracting includes a preliminary step of identifying at least one portion of the message as being a special block, and wherein the step of extracting treats the special block as being an indivisible unit when extracting the information.

10. The method as in claim 1, wherein the step of extracting information includes a preliminary step of filtering all or a part of the message to generate a filtered message, and wherein the step of extracting information includes a step of extracting at least one signature pattern comprised of at least one byte sequence from the filtered message.

11. A method of preventing maelstroms in computers and computer networks populated by entities capable of outputting messages automatically in response to incoming messages, comprising steps of:

for each message processed by an entity that may potentially be forwarded to another entity, extracting information from the message for permitting that message or a similar message to be recognized;

storing the extracted information for that message such that it is accessible by the entity;

for each further message processed by the entity, comparing a currently processed message against the stored information for a set of messages that have been previously processed by the entity; and if the stored information for a previously processed message is sufficiently similar to the information extracted from the currently processed message, preventing the currently processed message from triggering the generation of a new message, wherein the step of extracting information includes a preliminary step of filtering all or a part of the message to generate a filtered message, and further includes a preliminary step of identifying at least one portion of the message as being a special block, wherein the step of extracting information includes a step of extracting at least one signature pattern comprised of at least one byte sequence from the filtered message, and further treats the special block as being an indivisible unit when extracting the at least one signature pattern.

12. A method for preventing an occurrence of a maelstrom in a computer network populated by entities capable of generating an outgoing message automatically in response to an incoming message, comprising steps of:

providing a signature database for storing entries, each entry corresponding to a message processed by the entity and containing data for enabling a subsequent instance of a same message or a similar message to be identified;

for each message processed by the entity, extracting a signature from the message and comparing the extracted signature to the stored entries to determine if a match occurs;

if a match occurs, updating the matching stored entry and making a determination as to whether to generate a new signature database entry;

if not, determining whether to continue processing the message or not to continue processing the message;

if processing is to continue, transferring the message to a next message processing stage, else if processing is to terminate, terminating the processing of the message;

if the determination as to whether to generate a new signature database entry is to generate the entry, generating the new signature database entry by first extracting the new entry from all or a portion of the message, storing the extracted new signature database entry, and then determining whether to continue processing the message or not to continue processing the message;

else if a match does not occur, generating a new signature database entry by extracting the new entry from the message, storing the extracted new signature database entry, and then determining whether to continue processing the message or not to continue processing the message.

13. A method as in claim 12, wherein each signature database entry comprises a field for storing information expressive of when a message corresponding to the entry was last seen, and wherein the step of updating updates the field to reflect a time that the message was received or originated.

14. A method as in claim 12, wherein each signature database entry comprises fields for storing information that is descriptive of a region of the message from which the signature was extracted.

15. A method as in claim 14, wherein the fields store information expressive of a pattern of characters in the region, a length of the region, an offset from the pattern of characters to a predetermined point in the region, and checksum information for data found in the region.

16. A method as in claim 15, wherein the fields further store a hashing function related to data found in the region.

17. A method as in claim 12, wherein the step of extracting a signature is comprised of steps of:

storing a corpus of messages that are representative of messages processed by the entity;

providing all or a portion of the message, the message having at least one portion comprised of a sequence of bytes that are likely to remain substantially invariant from a first instance of the message to a second instance of the message;

selecting at least one candidate signature pattern of the message from the sequence of bytes and constructing a list of unique n-grams from the sequence of bytes;

for each of the unique n-grams, estimating a probability of an occurrence of the unique n-gram within sequences of bytes obtained from the stored corpus of messages;

for each candidate signature pattern that is comprised of one or more of the unique n-grams, estimating a false-positive probability of an occurrence of the candidate signature pattern within the sequences of bytes obtained form the corpus of messages; and comparing the estimated false-positive probabilities of the candidate signature patterns with one another and with a set of threshold probabilities, the threshold probabilities having values selected to reduce a likelihood of an occurrence of a false-positive indication during the use of any signature pattern with a false-positive probability less than the threshold.

18. A method as in claim 17, wherein the step of comparing is comprised of steps of:

discarding any candidate signature patterns for which an occurrence of a predetermined number of selected bytes is more common than a predetermined threshold;

evaluating an exact-match probability for remaining candidate signature patterns;

discarding any candidate signature patterns having an exact match false-positive probability that is above an exact match threshold;

retaining candidate signature patterns having the lowest estimated probabilities;

for each remaining candidate signature pattern i, evaluating an m-mismatch false-positive probability, starting with m=1, and incrementing m until the false positive probability exceeds an m-mismatch threshold, setting $M_i=m-1$;

for all candidate signature patterns that correspond to a particular message, selecting as one or more best signature patterns those having a largest value of M; and storing each of the one or more selected best signature patterns for each message as an entry in the signature database for subsequent use in identifying an instance of the message or a modified version of the message.

19. The method as in claim 18, wherein the selection of the one or more best signature patterns is biased to favor signature patterns that are located in different parts of the message.

20. The method as in claim 18, wherein the selection of the one or more best signature patterns comprises steps of:

(a) an initial step of defining an allowed region of the message body from which signature patterns are to be extracted;

(b) selecting a best signature pattern from the allowed region;

(c) excluding the selected signature pattern and n bytes on either side of the selected signature pattern from further consideration; and repeating steps b and c until either no further signature patterns can be obtained from the allowed region, or until a maximum number of signature patterns is obtained.

21. The method as in claim 12, wherein the steps of extracting include a preliminary step of transforming all or a portion of the message to an invariant form.

22. A method as in claim 12, wherein the further processing of the message includes a step of forwarding the message or a processed form of the message to at least one recipient.

23. The method as in claim 12, and comprising a preliminary step of filtering a message prior to the step of extracting so as to remove insignificant variations between messages.

24. The method as in claim 23, wherein the step of filtering is comprised of at least one of removing message header data; removing multiple consecutive whitespace characters; removing non-alphanumeric characters; or mapping all characters to the same case.

25. The method as in claim 12, wherein the step of comparing comprises a step of recognizing textual elements that are likely to indicate a prior forwarding of the message.

26. The method as in claim 12, wherein the step of extracting includes a preliminary step of transforming all or a portion of the message to an invariant form, and wherein the step of transforming to an invariant form includes a step of identifying at least one of an inclusion, attachment or non-textual data within the message.

27. A method as in claim 12, wherein the step of extracting includes a preliminary step of identifying at least one portion of the message as being a special block, and wherein the step of extracting treats the special block as being an indivisible unit when extracting the information.

28. The method as in claim 12, wherein the step of extracting information includes a preliminary step of filtering all or a part of the message to generate a filtered message, and wherein the step of extracting includes a step of extracting at least one signature pattern comprised of at least one byte sequence from the filtered message.

29. The method as in claim 12, wherein the step of extracting includes a preliminary step of filtering all or a part of the message to generate a filtered message, and further includes a preliminary step of identifying at least one portion of the message as being a special block, wherein the step of extracting includes a step of extracting at least one signature pattern comprised of at least one byte sequence from the filtered message, and further treats the special block as being an indivisible unit when extracting the at least one signature pattern.

30. A digital data processing system comprising interconnected entities capable of outputting messages automatically in response to incoming messages, said system comprising, in at least one of said entities, a subsystem for preventing an occurrence of a maelstrom, comprising:

a unit for extracting information from messages processed by the entity, the messages being those that have the potential to trigger an occurrence of a maelstrom, the extracted information being chosen so as to minimize a likelihood that a different message would also contain the extracted information;

a memory for storing the extracted information in a database of extracted information, said database having the extracted information for each message stored in an entry associated with the message; and a unit for comparing each message processed by the entity against the database entries and, if an entry is found to match exactly to the processed message, for preventing triggering the outputting of a new message, and if an entry is found to similarly match, but not exactly match, the processed message, for preventing triggering the outputting of a new message.

31. The system as in claim 30, wherein said extracting unit extracts at least one signature pattern comprised of at least one byte sequence contained in the message.

32. The system as in claim 30, wherein said extracting unit computes a checksum from one or more byte sequences contained within the message.

33. The system as in claim 30, wherein said extracting unit computes a hash function from one or more byte sequences contained within the message.

34. The system as in claim 30, wherein said extracting unit compresses information contained within the message.

35. The system as in claim 30, wherein said comparing unit compares at least one of a checksum or a hashblock table to determine an approximate identification of a portion of the message that may differ from a past message that has an entry stored in said database.

36. The system as in claim 30, wherein said extracting unit operates to first transform all or a portion of the message to an invariant form.

37. A digital data processing system comprising interconnected entities capable of outputting messages automatically in response to incoming messages, said system comprising, in at least one of said entities, a subsystem for preventing an occurrence of a maelstrom, comprising:

a unit for extracting information from messages processed by the entity, the extracted information permitting that message or a similar message to be recognized;

a memory for storing the extracted information in a database of extracted information, said database having the extracted information for each message stored in an entry associated with the message; and a unit for comparing each message processed by the entity against the database entries and, if an entry is sufficiently similar to the processed message, for preventing triggering the outputting of a new message, wherein said extracting unit operates to first filter all or a part of the message to generate a filtered message, and further operates to identify at least one portion of the message as being a special block, and wherein said extracting unit extracts at least one signature pattern comprised of at least one byte sequence from the filtered message, and treats the identified special block as being an indivisible unit when extracting the at least one signature pattern.

38. A computer program embodied on a computer-readable medium for providing a subsystem to prevent an occurrence of a maelstrom, comprising:

an information extracting segment for extracting information from messages processed by an entity, the messages being those that have the potential to trigger an occurrence of a maelstrom, the extracted information being chosen so as to minimize a likelihood that a different message would also contain the extracted information;

a storage segment for storing the extracted information in a database of extracted information, said database having the extracted information for each message stored in an entry associated with the message; and a comparison segment for comparing messages processed by the entity against the database entries stored in the storage segment and, if an entry is found to match exactly to the message, for preventing triggering the generation and forwarding of a new message; and if an entry is found to similarly match, but not exactly match, to the message, for preventing triggering the generation and forwarding of a new message.

* * * * *